(12) United States Patent
Sawada et al.

(10) Patent No.: US 7,029,410 B2
(45) Date of Patent: Apr. 18, 2006

(54) SYSTEM FOR PREVENTING BELT SLIP OF BELT-TYPE CONTINUOUSLY VARIABLE TRANSMISSION

(75) Inventors: Makoto Sawada, Fuji (JP); Katsumi Doihara, Fuji (JP)

(73) Assignee: JATCO LTD, (JP)

( * ) Notice: Subject to any disclaimer, the term of this patent is extended or adjusted under 35 U.S.C. 154(b) by 224 days.

(21) Appl. No.: 10/647,667

(22) Filed: Aug. 25, 2003

(65) Prior Publication Data

US 2004/0110584 A1     Jun. 10, 2004

(30) Foreign Application Priority Data

Aug. 26, 2002  (JP) .............. 2002-245079

(51) Int. Cl.
*F16H 61/12* (2006.01)
*F16H 61/18* (2006.01)

(52) U.S. Cl. ............... 474/28; 474/18; 477/45
(58) Field of Classification Search .................. 474/8, 474/12, 18, 28, 44; 477/43–48, 27, 906, 477/209–210; 73/118.1
See application file for complete search history.

(56) References Cited

U.S. PATENT DOCUMENTS

| | | | | |
|---|---|---|---|---|
| 5,496,230 A | | 3/1996 | Ando et al. | ............. 477/111 |
| 5,924,450 A | * | 7/1999 | Sakakibara et al. | .... 137/625.66 |
| 6,179,739 B1 | * | 1/2001 | Tsai et al. | ............. 474/12 |
| 6,243,638 B1 | | 6/2001 | Abo et al. | ............. 701/51 |
| 6,443,871 B1 | * | 9/2002 | Taniguchi et al. | ........... 477/44 |
| 6,677,685 B1 | * | 1/2004 | Pfleger et al. | ........... 290/40 C |
| 2001/0049315 A1 | | 12/2001 | Tsutsui | ........... 477/44 |

FOREIGN PATENT DOCUMENTS

| | | | | |
|---|---|---|---|---|
| DE | 101 00 778 A1 | 12/2001 | | |
| EP | 0 895 006 A1 | 2/1999 | | |
| EP | 1 176 341 A2 | 1/2002 | | |
| JP | 02-159448 A | * 6/1990 | ........... | 76/606 R |
| JP | 06-17923 A | * 1/1994 | ........... | 477/45 |
| JP | 06-137400 A | * 5/1994 | ........... | 477/27 |
| JP | 2001-349418 A | * 12/2001 | | |

* cited by examiner

*Primary Examiner*—Marcus Charles
(74) *Attorney, Agent, or Firm*—Rossi, Kimms & McDowell, LLP

(57) ABSTRACT

CVT control unit of a belt CVT checks whether a reverse rotation of pulleys is generated. When the reverse rotation is generated, a PLpri torque capacity is calculated from a primary pressure Ppri, and this PLpri torque capacity is used as a torque limit value of a torque-down control of an engine control unit. An input torque to a transmission mechanism is compared with the PLpri torque capacity, and when the input torque exceeds the PLpri torque capacity, shortage of the PLpri torque capacity for the input torque is calculated. Then, this shortage is added to the input torque as a correction amount, and a line pressure is set on the basis of a result of this addition.

5 Claims, 5 Drawing Sheets

SYSTEM FOR PREVENTING BELT SLIP OF BELT-TYPE CONTINUOUSLY VARIABLE TRANSMISSION

BACKGROUND OF THE INVENTION

1. Field of the Invention

The present invention relates to a system for preventing belt slip of a belt-type continuously variable transmission.

2. Description of the Prior Art

Conventionally, as a continuously variable transmission for a vehicle, there is, for example, a belt-type continuously variable transmission (hereinafter referred to as a "belt CVT") with a V-belt.

In this belt CVT, a transmission mechanism is constructed by winding the V-belt around pulleys comprised of a primary pulley connected to an engine side and a secondary pulley connected to an axle side, and groove widths of the primary pulley and the secondary pulley are variably controlled by hydraulic pressure.

A thrust of the pulley is determined according to an input torque and a gear ratio and converted into a hydraulic pressure on the basis of predetermined values such as pressure-receiving areas of the secondary pulley and the primary pulley, and this hydraulic pressure is supplied to the transmission mechanism as a target line pressure.

The primary pulley and the secondary pulley are respectively provided with a first cylinder chamber and a second cylinder chamber, and a primary pressure obtained by regulating line pressure and a secondary pressure obtained by regulating line pressure are respectively supplied to the first cylinder chamber and the second cylinder chamber. The groove widths of the primary pulley and the secondary pulley are changed by hydraulic pressure supplied to the respective cylinder chambers during running of the vehicle, and gear ratio is continuously changed according to a contact radius ratio (pulley ratio) between the V-belt and the respective pulleys.

While line pressure is controlled to be held to a minimum pressure during idling of the engine, a torque-down control to restrain output torque of the engine is performed so that the transmission mechanism receives no excessive torque exceeding a limit value of an allowable input torque of the belt CVT. A torque-down amount by this torque-down control is usually determined from a throttle valve opening and an engine speed and is set so as to reduce according to the increase of the engine speed and to increase according to the increase of the throttle valve opening.

In such a belt CVT, when the vehicle is once stopped by removal of a driver's foot from the accelerator pedal and braking during running on a upward slope in a forward "D" range and started again in the "D" range, the vehicle is slightly moved backward by the removal of the driver's foot from a brake pedal, and then a reverse torque is applied to an output shaft of the belt CVT, and a reverse rotation is generated in the pulleys.

Even if the pulley ratio, the input torque, an input rotation speed or the secondary pressure is the same when the pulleys are reversely rotated, balance in hydraulic pressure between the primary pressure and the secondary pressure is lost, the primary pressure is especially reduced by half, and torque capacity of the primary pulley is reduced, so that belt slip may be generated. However, no control to prevent this disruption of the balance of hydraulic pressure is conventionally performed.

In case a control to hold the line pressure to a minimum pressure during idling by removal of the driver's foot is adopted, the hydraulic pressure is maintained low under a condition that the reverse rotation of the pulley is generated.

This reverse rotation of the pulleys is generated also when the vehicle is started again in an "R" range after it is stopped once while running backward in the "R" range on a down slope, whereby the same problem occurs.

That is, the reverse rotation of the pulleys discussed herein means a phenomenon that the pulleys are rotated reversely with respect to a direction of a normal rotation of the pulleys (forward direction in the "D" range or backward direction in the "R" range) to be supposed in a currently selected range position. The reverse rotation of the pulleys is used in this meaning hereinafter.

SUMMARY OF THE INVENTION

In view of the aforementioned conventional problem, therefore, it is an object of the present invention to provide a system for preventing belt slip of a belt-type continuously variable transmission in which generation of the belt slip is prevented even when a reverse rotation of pulleys is generated.

Therefore, the present invention provides a system for preventing a belt slip of a belt-type continuously variable transmission in which a transmission mechanism is constructed by winding a belt around pulleys including a primary pulley connected to an engine side and a secondary pulley connected to an output shaft, and a primary pressure using line pressure as an original pressure acts on the primary pulley and a secondary pressure using line pressure as an original pressure acts on the primary pulley, comprising: a primary pressure sensor for detecting the primary pressure; primary pulley torque capacity calculating means for calculating a torque capacity of the primary pulley from the primary pressure; pulley reverse rotation detecting means for detecting a reverse rotation of the pulleys; and line pressure correcting means for comparing an input torque and the torque capacity of the primary pulley at the time of the reverse rotation of the pulleys, increasing and correcting the input torque according to a shortage of the torque capacity of the primary pulley when the input torque is larger than the torque capacity of the primary pulley and setting a line pressure on the basis of the input torque increased and corrected.

Therefore, belt slip caused at the time of starting the vehicle on a slope or the like can be prevented.

The above and further objects and features of the invention will be more fully apparent from the following description when the same is considered with reference to the accompanying drawings.

DETAILED DESCRIPTION OF THE PREFERRED EMBODIMENT

A preferred embodiment of the present invention will be described hereinbelow.

Figure 1:
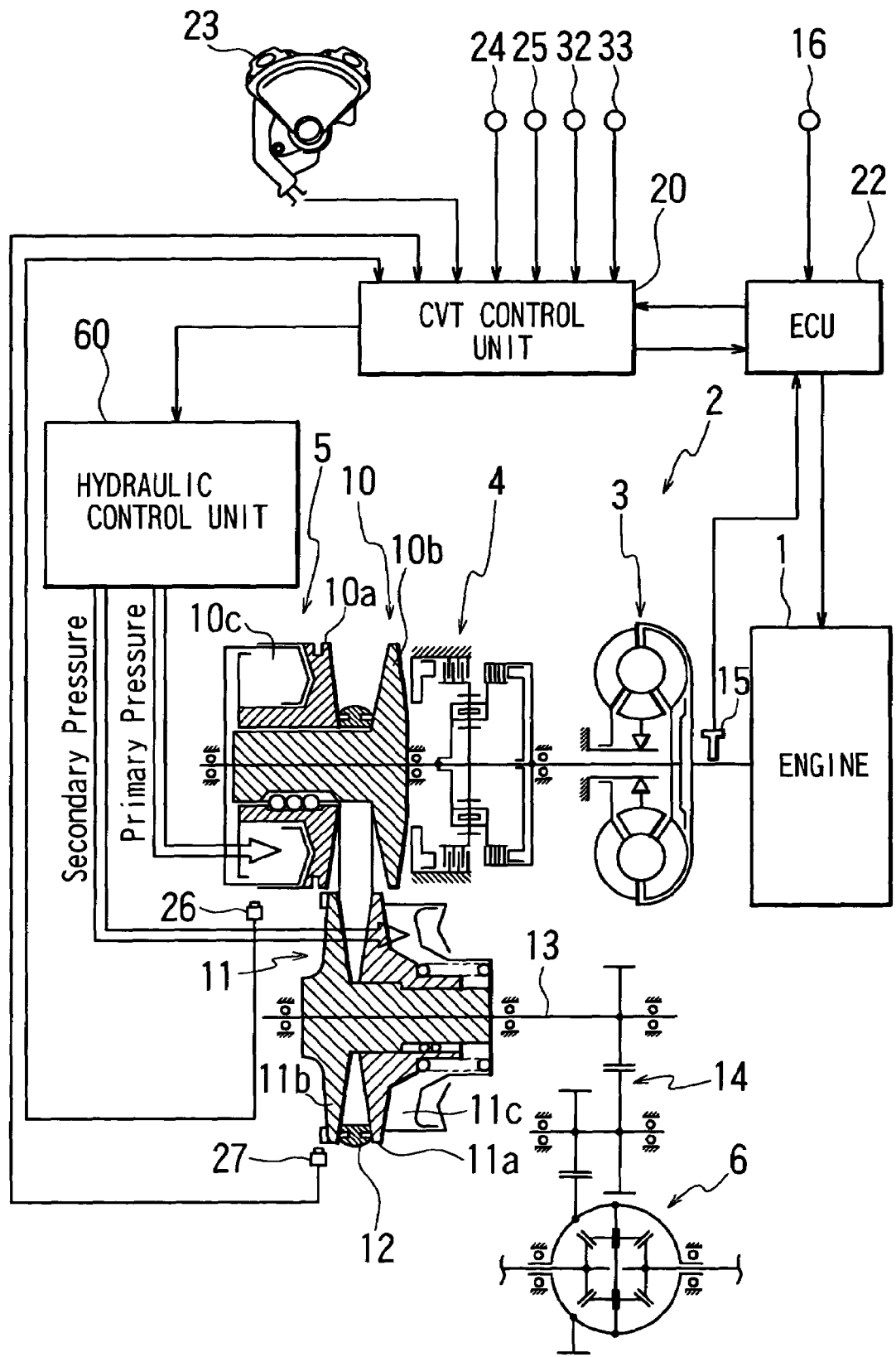
FIG. 1 is a schematic block diagram showing a V-belt type continuously variable transmission to which the present invention is applied.
Figure 2:
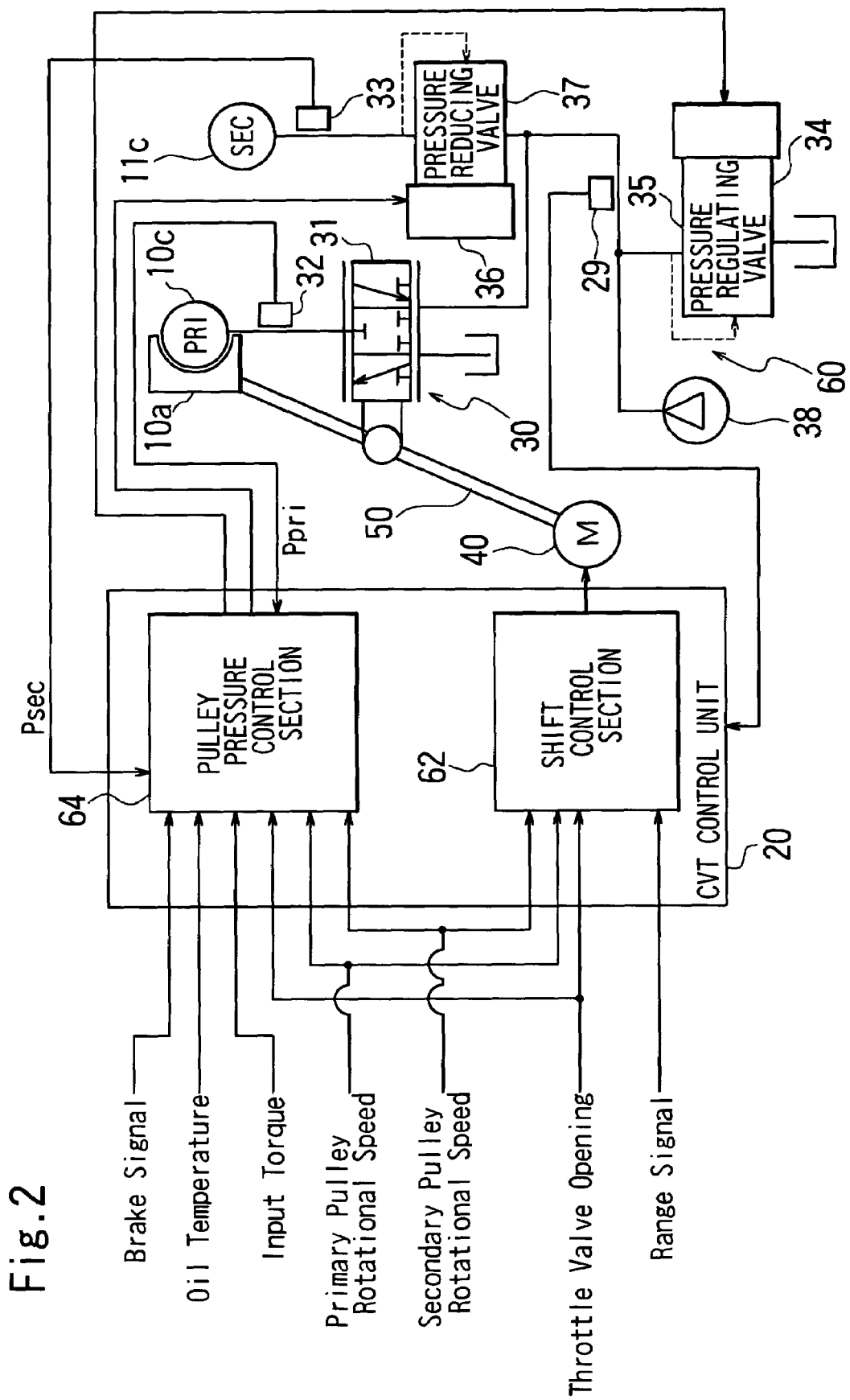
FIG. 2 is a schematic block diagram showing a hydraulic control unit and a CVT control unit.

FIG. 1 is a schematic block diagram showing a first embodiment in which the present invention is applied to a belt CVT, and FIG. 2 is a schematic block diagram showing a hydraulic control unit and a CVT control unit.

In FIG. 1, a belt CVT 2 comprised of a torque converter 3 provided with a lockup clutch and a transmission mechanism 5 provided with a forward/reverse switching mechanism 4 is connected to an engine 1. The transmission mechanism 5 is, as a pair of pulleys, provided with a primary pulley 10 arranged on an input shaft side and a secondary pulley 11 connected to an output shaft 13, and this pair of pulleys are connected to each other by a V-belt 12. The output shaft 13 is connected to a differential 6 through an idler gear 14.

Gear ratio of the transmission mechanism 5 and contact frictional force of the V-belt 12 are controlled by a hydraulic control unit 60 activated according to a command from a CVT control unit 20. The CVT control unit 20 is connected to an engine control unit (ECU) 22 controlling the engine 1, and the former and the latter exchange information with each other.

The CVT control unit 20 determines the gear ratio and the contact frictional force on the basis of an input torque information from the engine control unit 22, a throttle valve opening (TVO) from a throttle opening sensor 24 or the like. The input torque information includes an engine demand torque and an engine actual torque estimated as to be actually generated by the engine.

The engine control unit 22 is connected with an engine speed sensor 15 for detecting rotational speed of the engine 1, and the CVT control unit 20 is connected with a primary speed sensor 26 for detecting rotational speed of the output shaft of the torque converter 3.

The primary pulley 10 of the transmission mechanism 5 is comprised of a fixed conical plate 10b rotating together with the input shaft and a movable conical plate 10a which is opposed to the fixed conical plate 10b to form a V-shaped pulley groove and can be moved in the axial direction according to a hydraulic pressure (hereinafter referred to as primary pressure) acting on a primary pulley cylinder chamber 10c.

The secondary pulley 11 is comprised of a fixed conical plate 11b rotating together with an output shaft 13 and a movable conical plate 11a which is opposed to the fixed conical plate 11b to form a V-shaped pulley groove and can be moved in the axial direction according to a hydraulic pressure (hereinafter referred to as secondary pressure) acting on a secondary pulley cylinder chamber 11c.

The input torque inputted from the engine 1 is inputted through the torque converter 3 to the transmission mechanism 5 and transmitted from the primary pulley 10 to the secondary pulley 11 via the V-belt 12. The movable conical plate 10a of the primary pulley 10 and the movable conical plate 11a of the secondary pulley 11 are displaced in the axial direction to change a contact radius of the V-belt 12 and the respective pulleys 10, 11, whereby gear ratio between the primary pulley 10 and the secondary pulley 11 can be continuously changed.

As shown in FIG. 2, a hydraulic control unit 60 is mainly comprised of a pressure-regulating valve 35 for controlling line pressure, a shift control valve 30 for controlling a primary pressure (Ppri) applied to the primary pulley cylinder chamber 10c and a pressure-reducing valve 37 for controlling a secondary pressure (Psec) applied to the secondary pulley cylinder chamber 11c.

The shift control valve 30 is connected to a servo link 50 constituting a mechanical feedback mechanism and activated by a step motor 40 connected to one end of the servo link 50 and at the same time receives feedback of the groove width, that is, the actual gear ratio from the movable conical plate 10a of the primary pulley 10 connected to the other end of the servo link 50.

A line pressure control system is constituted by the pressure-regulating valve 35 provided with a solenoid 34 for regulating pressure oil from a hydraulic pump 38 and regulates the pressure oil to a predetermined line pressure according to a driving state in response to a command (for example a duty signal) from the CVT control unit 20. The line pressure is respectively supplied to the shift control valve 30 for controlling primary pressure and to the pressure-reducing valve 37 provided with a solenoid 36 for controlling secondary pressure.

Gear ratio between the primary pulley 10 and the secondary pulley 11 is controlled by the step motor 40 driven according to a shift command signal form the CVT control unit 20, a spool 31 of the shift control valve 30 is activated according to a displacement of the servo link 50 moving in response to the step motor 40, and primary pressure obtained by regulating line pressure supplied to the shift control valve 30 is supplied to the primary pulley 10, whereby groove width is variably controlled to set a predetermined gear ratio.

The shift control valve 30 supplies and discharges hydraulic pressure to and from the primary pulley cylinder chamber 10c according to the displacement of the spool 31, regulates the primary pressure to achieve a target gear ratio commanded in a drive position of the step motor 40 and closes the spool 31 according to the displacement from the servo link 50 when shifting is actually completed.

As shown in FIG. 1, the CVT control unit 20 reads signals from a primary pulley speed sensor 26 for detecting rotational speed of the primary pulley 10 of the transmission mechanism 5, a secondary pulley speed sensor 27 for detecting rotational speed (or vehicle speed) of the secondary pulley 11, a primary pressure sensor 32 for detecting primary pressure acting on the primary pulley cylinder chamber 10c of the primary pulley and a secondary pressure sensor 33 for detecting secondary pressure acting on the secondary pulley cylinder chamber 11c of the secondary pulley, a range signal from an inhibitor switch 23 for detecting not-shown shift lever positions P, R, N, D or the like, a throttle valve opening (TVO) from a throttle opening sensor 24 for detecting an opening of a throttle valve opened and closed by operations of the driver and oil temperature of the transmission mechanism 5 which is detected by a temperature sensor 25, thereby variably controlling gear ratio or contact frictional force of the V-belt 12.

The CVT control unit 20 is comprised of a shift control section 62 that determines the target gear ratio according to the vehicle speed, the throttle valve opening, the range signal and the rotational speed of the primary pulley and drives the step motor 40 to control the actual gear ratio toward the target gear ratio, and a pulley pressure control section 64 that calculates the thrust (contact frictional force) of the primary pulley 10 and the secondary pulley 11 on the basis of input torque from the engine control unit 22, gear ratio and oil temperature and converts the calculated thrust into an oil pressure.

The pulley pressure control section 64 determines a target value of line pressure from input torque information, gear ratio based on rotation speeds of the primary pulley and the secondary pulley and oil temperature and controls the line pressure by activating the solenoid 34 of the pressure-regulating valve 35. The pulley pressure control section 64 also determines a target value of secondary pressure and activates the solenoid 36 of the pressure-reducing valve 37 to control the secondary pressure by feedback control. Engine actual torque or engine demand toque used as input torque information is arbitrarily selected according to control purpose.

Further, the pulley pressure control section 64 calculates torque capacity (PLpri torque capacity) of the primary pulley on the basis of primary pressure from the primary pressure sensor 32 and transmits a torque limit value for a torque-down control to the engine control unit 22. The pulley pressure control section 64 also detects present and absence of reverse rotation of the pulley accompanying the stop of the vehicle and sets line pressure by adding shortage of torque in case the PLpri torque capacity is smaller than the input torque when the reverse rotation of the pulley is detected.

The engine control unit 22 performs torque-down control of the engine within a range of a torque limit value supplied from the CVT control unit 20 in a predetermined driving state.

Figure 3:
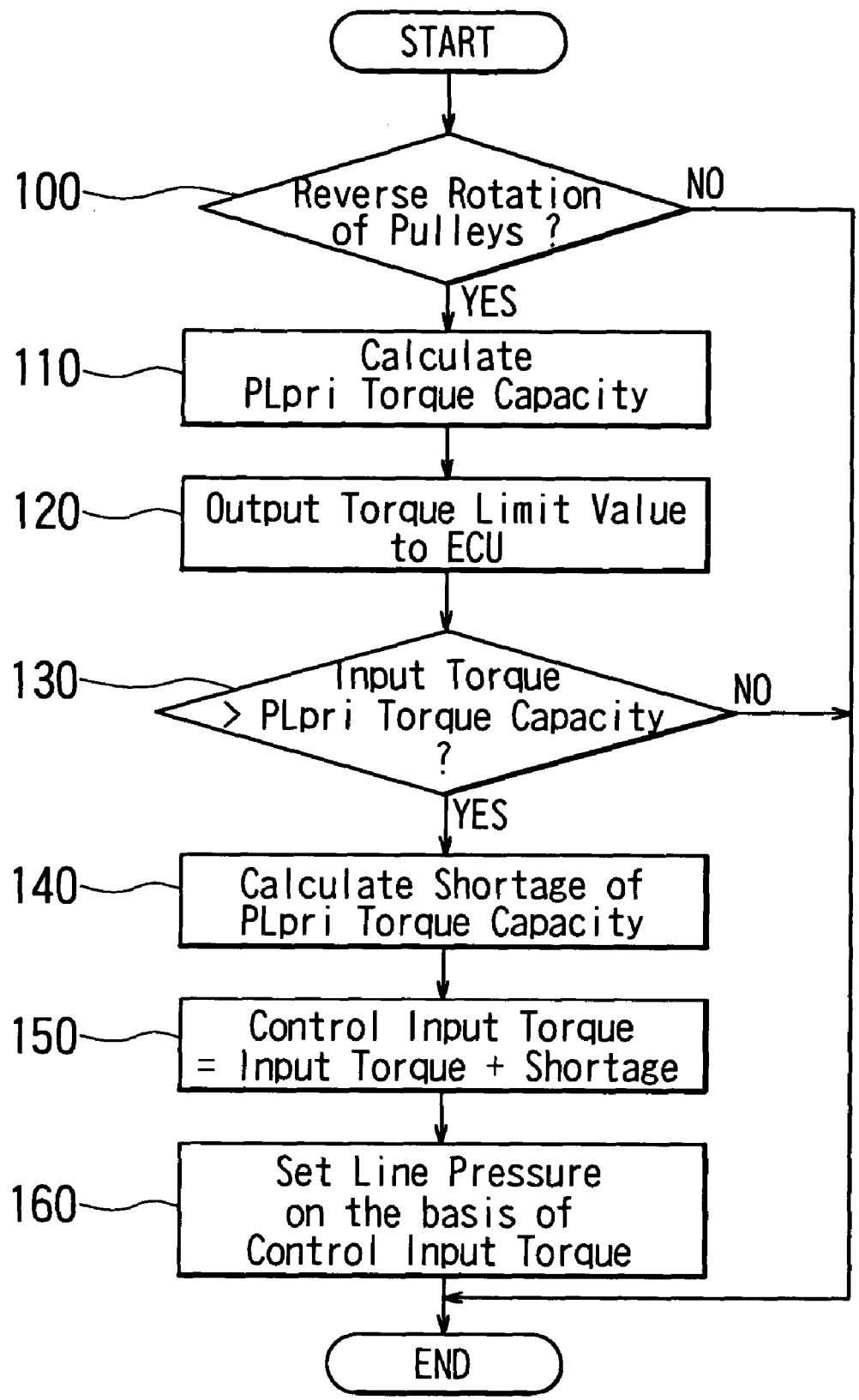
FIG. 3 is a flowchart showing a flow of control that is applied to reverse rotation of pulleys.

FIG. 3 is a flowchart showing a flow of control that is applied to reverse rotation of the pulleys in the pulley pressure control section 64.

First in a Step 100, it is checked whether reverse rotation of the pulleys is generated. When the reverse rotation of the pulleys is generated, the routine proceeds to a Step 110, and when no reverse rotation is generated, this control flow is finished.

In the Step 110, the PLpri torque capacity is calculated from the primary pressure Ppri detected by the primary pressure sensor 32.

In a Step 120, the PLpri torque capacity calculated is transmitted to the engine control unit 22 as a torque limit value. Since the engine control unit 22 controls output (engine actual torque) of the engine by setting this torque limit value as an upper limit, torque down is performed when the engine actual torque is larger than this torque limit value. Here, there is no problem if this torque limit value is smaller than the PLpri torque capacity calculated, but since power performance is degraded as the upper limit of the torque limit value is set to a small value, it is desirable that the upper limit is set to the PLpri torque capacity.

Next, in a step 130, a comparison of input torque and the PLpri torque capacity is performed. Here, as input torque, there is used an engine demand torque which is a toque required to the engine, and calculated from an accelerator stroke from an accelerator stroke sensor 16 and an engine speed. This engine demand torque has a value not reflecting a torque limit value transmitted from the CVT control unit 20. When the input torque is larger than the PLpri torque capacity, the routine proceeds to a Step 140, and when the input torque is smaller than the PLpri torque capacity, this control flow is finished.

In the Step 140, shortage (input torque—PLpri torque capacity) of the PLpri torque capacity for the input torque is calculated. Then, in a Step 150, a control input torque is determined by adding the shortage of the PLpri torque capacity as a correction amount to the input torque. The correction amount can be provided with a gain or an offset if necessary.

In case a control to maintain a line pressure to a minimum pressure is performed when the engine is idling, this control to maintain the minimum pressure is cancelled.

After this, in a Step 160, a line pressure is set on the basis of the above-mentioned control input torque.

Figure 4:
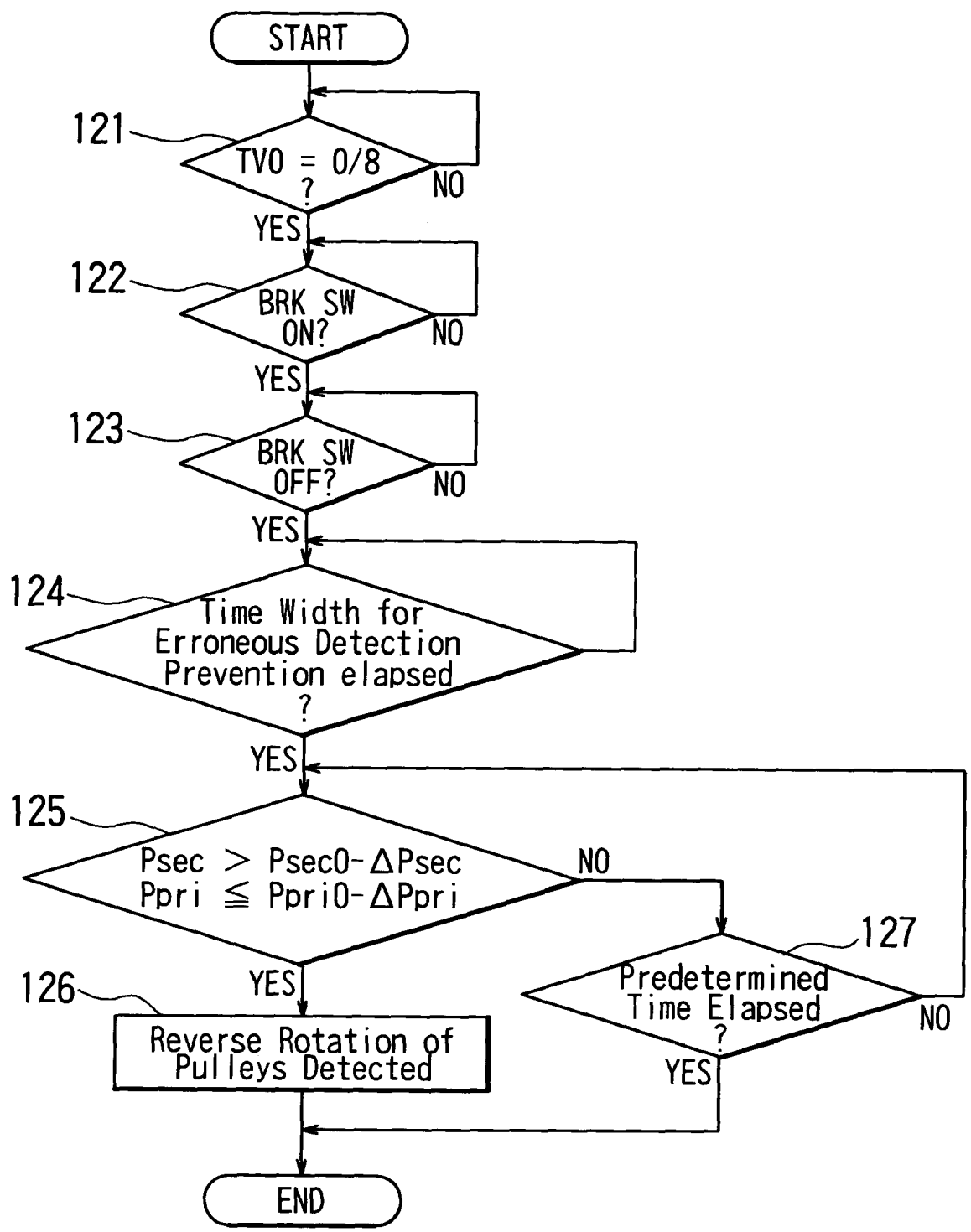
FIG. 4 is a diagram showing a detection process of the reverse rotation of the pulleys.
Figure 5:
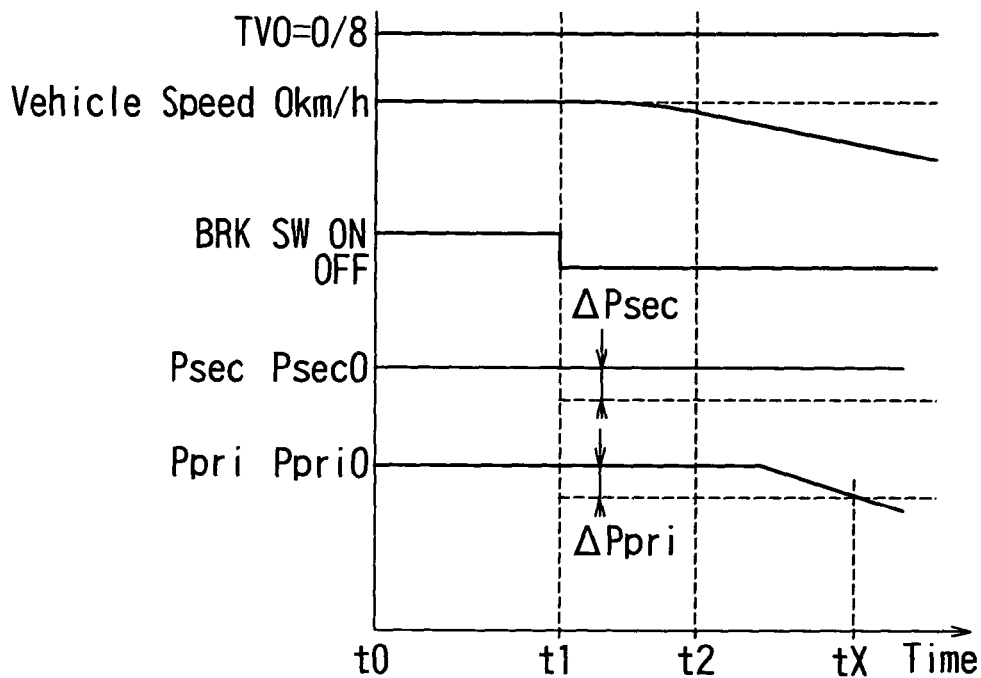
FIG. 5 is a diagram showing a state of a vehicle running a slope.

Next, FIG. 4 shows in detail a flow of detection of the reverse rotation of the pulley in the Step 120, that is, a flow of detection of input of reverse torque. FIG. 5 is a diagram showing a state of a vehicle stopping on a slope (upward slope) and changes of the primary pressure and the secondary pressure.

In a Step 121, the CVT control unit 20 determines whether a signal from the throttle-opening sensor 24 is 0/8 (fully closed state of throttle opening). When the throttle valve opening is 0/8, the routine proceeds to a Step 122.

In the Step 122, it is determined whether a brake is depressed, and thus a signal from a brake switch (BRK SW) 42 is ON. The state of the vehicle at this time is at vehicle speed of 0 km/h as shown in FIG. 5. When the brake switch is ON, it is supposed that secondary pressure detected by the secondary pressure sensor 33 and primary pressure detected by the primary pressure sensor 32 are respectively Psec0 and Ppri0.

In a Step 123, it is determined whether the brake is released and a signal from the brake switch 42 is OFF. Time when release of the brake is detected is set as a time t1. When the brake is released, the vehicle gradually starts to move backward as shown in FIG. 5, and the vehicle speed increases in the negative direction.

In a Step 124, it is determined whether a time width for erroneous detection prevention due to inertia torque correction elapses from the time t1 when the brake is released.

The CVT control unit 20 executes inertial torque correction for increasing hydraulic pressure of the primary pressure and the secondary pressure in order to prevent slip of the V-belt caused by inertia torque when the vehicle speed is more than a predetermined speed and the brake is in the ON state. At the time t1 when the brake-ON state is switched to the brake-OFF state, therefore, the inertia torque correction is released, and hydraulic pressure reduction of the primary pressure and the secondary pressure occurs. Detection of the reverse torque input to the belt CVT is started from a time t2 when the time width for the erroneous detection prevention elapsed so that this hydraulic pressure reduction is not detected. In FIG. 5, since the vehicle speed is smaller than the predetermined speed, the inertia torque correction is not performed, and no hydraulic pressure reduction of the secondary pressure and the primary pressure occurs at the time t1.

If it is determined that the time width for the erroneous detection prevention elapsed in the Step 124, the CVT control unit 20 starts a detection process of the reverse torque input in a Step 125. This detection process of the reverse torque input is performed by determining whether the primary pressure (Ppri) and the secondary pressure (Psec) satisfy the following expression.

$$P\text{sec} > P\text{sec}0 - \Delta P\text{sec} \quad (1)$$

$$P\text{pri} \leq P\text{pri}0 - \Delta P\text{pri} \quad (2)$$

where ΔPpri is 0.1 Mpa, for example.

If there is a reverse torque input to the belt CVT, hydraulic pressure balance between the primary pressure and the secondary pressure is lost, and thereby relationship of the expressions (1), (2) is satisfied. Therefore, the presence or absence of the reverse torque input to the belt CVT can be recognized by determining whether the primary pressure and the secondary pressure satisfy the expressions (1), (2), in other word, whether the primary pressure is decreased lower than the set value, though the secondary pressure is not lowered substantially.

If it is judged that the pressure relationship of the expressions (1), (2) is satisfied in the Step 125, the routine proceeds to a Step 126, and it is judged that the reverse torque input to the CVT has been detected, that is, the reverse rotation of the pulleys is generated at a time tX when the primary pressure and the secondary pressure have satisfied the pressure relationship of the expressions (1), (2).

If it is judged that the primary pressure and the secondary pressure do not satisfy the pressure relationship of the expressions (1), (2) in the Step 125, on the other hand, the routine proceeds to a Step 127. In the Step 127, it is determined whether a predetermined time when the detection process is stopped elapses from the time t2 when the detection process of the reverse torque input is started. When the predetermined time does not elapse, the routine returns to the Step 125, and the detection process of the reverse torque input is performed. When it is determined that the predetermined time elapsed, it is judged that no reverse rotation of the pulleys is generated, and the control flow is finished.

In this embodiment, the step 100 corresponds to pulley reverse rotation detecting means according to the invention, the Step 110 corresponds to primary pulley torque capacity calculating means, and the Steps 130 to 160 correspond to line pressure correcting means. The engine control unit 22 functions as torque down controlling means.

There is supposed a case in which a torque capacity is calculated from a primary pressure and the torque capacity falls short in general, an estimated torque correction control for correcting input torque, setting an apparently large input and increasing line pressure used as an original pressure of the primary pressure and the secondary pressure is simply adopted. In this case, when the torque capacity is apparently insufficient but actually sufficient, for example, even when one of the pulleys touches a mechanical stopper, hydraulic pressure is increased to a high pressure, fuel consumption is deteriorated and power performance is lowered at the time of starting the vehicle in a high accelerator opening.

Therefore, in the belt CVT of this embodiment constructed as above in which primary pressure using line pressure as original pressure acts on the primary pulley and secondary pressure using line pressure as original pressure acts on the secondary pulley, a primary pulley torque capacity is calculated from the primary pressure, reverse rotation of the pulleys is detected simultaneously, and comparison between input torque and the primary pulley torque capacity is performed at the time of reverse rotation of the pulleys. And thus, when the input torque is larger than the primary pulley torque capacity, the input torque is increased and corrected according to shortage of the primary pulley torque capacity, and the line pressure is set on the basis of the input torque increased and corrected. This allows increase of the primary pressure whose balance is lost during reverse rotation of the pulleys and prevention of slip between the primary pulley and the V-belt. Since the line pressure is increased when the reverse rotation of the pulleys is detected, the line pressure does not increase to a high hydraulic pressure unnecessarily and cause degradation of the power performance.

Since increase and correction of the input torque are especially performed by adding the shortage of the primary pulley torque capacity to the input torque, the torque capacity of the primary pulley can be set to a proper one.

Moreover, in the engine control unit 22, torque-down control excellent in responsibility compared to hydraulic pressure is simultaneously performed. Thereby, engine torque can be early controlled to be smaller than torque capacity of the primary pulley in case reverse rotation of the pulleys is detected, and generation of slip of the V-belt can be certainly prevented. Further, since output of the engine is controlled by setting the primary pulley torque capacity occasionally calculated as an upper limit, as describe above, slip of the V-belt caused thereinafter can be prevented, torque limit value of the engine gradually exceeds the engine demand torque, and torque down of the engine is not actually performed, so that degradation of power performance can be also prevented.

Moreover, since input torque compared with the primary pulley torque capacity is an engine demand torque, the input torque is not affected by reduction of the engine actual torque even when the torque-down control is performed, and the primary pressure can be certainly increased.

Figure 6:
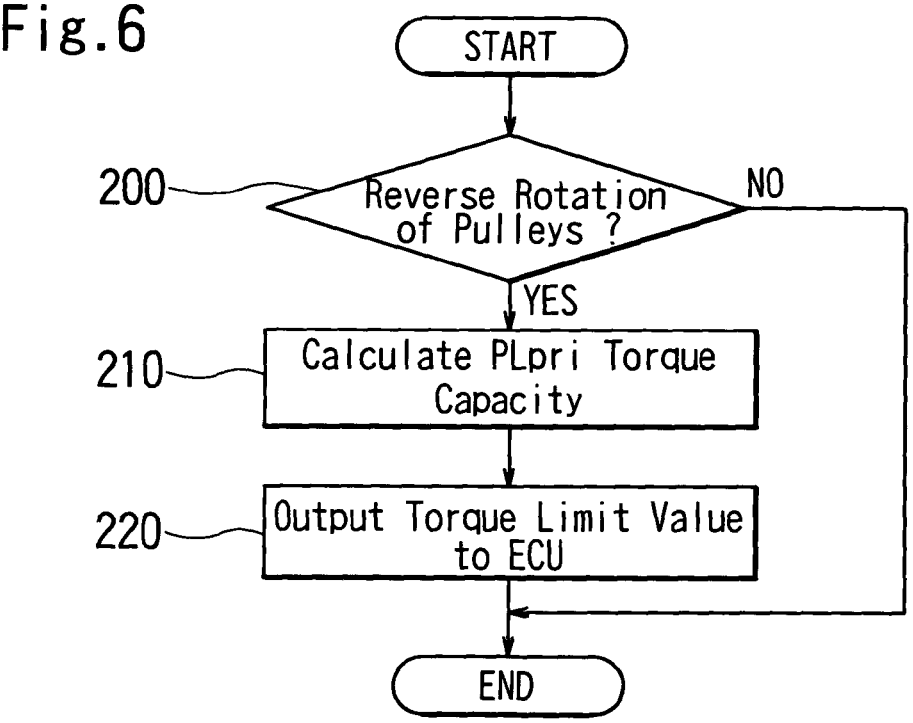
FIG. 6 is a flowchart showing a second embodiment.

Next, a second embodiment will be explained. FIG. 6 is a flow chart showing a control according to the second embodiment and corresponds to FIG. 3 in the first embodiment.

Steps 200 to 220 are the same as the Steps 100 to 120 of the flow chart of FIG. 3. That is, the control to set line pressure based on the PLpri torque capacity as described on and after the Step 130 is omitted.

First in the Step 200, it is checked whether reverse rotation of the pulleys is generated. When the reverse rotation of the pulleys is generated, the PLpri torque capacity is calculated from the primary pressure Ppri detected by the primary pressure sensor 32 in a Step 210.

Then, in the Step 220, the above PLpri torque capacity calculated is transmitted as a torque limit value to the engine control unit 22. The engine control unit 22 controls output (engine actual torque) of the engine by setting this torque limit value as an upper limit.

Other features are the same as those of the first embodiment.

According to this embodiment, the engine control unit 22 performs a torque-down control excellent in responsibility compared with oil pressure. When reverse rotation of the pulleys is detected, therefore, the engine torque is early controlled to be smaller than torque capacity of the primary pulley, and slip of the V-belt can be certainly prevented.

As for reverse rotation of the pulleys, one example of its detection process is shown in the flow chart of FIG. 4 in the above embodiment, however the present invention is not limited to this, but another proper detection process may be adopted. For instance, by providing three or more kinds of gears having different width each other on the secondary pulley 11 and using a Hall element type sensor as the secondary pulley speed sensor 27, a direction of rotation of the secondary pulley 11 can be detected, and thus the reverse rotation of the pulleys can be detected based on the direction of rotation of the secondary pulley and the range signal from the inhibitor switch 23.

What is claimed is:

1. A system for preventing a belt slip of a continuously variable transmission where a belt entrains around a primary pulley connected to an engine and a secondary pulley connected to an output shaft, and a primary pressure and a secondary pressure respectively using a line pressure as an original pressure act on the primary pulley and the secondary pulley, comprising:

a primary pressure sensor for detecting the primary pressure;

primary pulley torque capacity calculating means for calculating a torque capacity of the primary pulley from the primary pressure;

pulley reverse rotation detecting means for detecting a reverse rotation of the pulleys, where the pulleys rotate in the direction opposite to the intended rotating direction currently set for; and line pressure correcting means for comparing an input torque and the torque capacity of the primary pulley at the time of the reverse rotation of the pulleys and setting the line pressure on the basis of a control input torque obtained by increasing and correcting the input torque according to a shortage of the torque capacity of the primary pulley when the input torque is larger than the torque capacity of the primary pulley.

2. A system for preventing a belt slip of a continuously variable transmission according to claim 1, wherein said control input torque is obtained by adding the shortage of the torque capacity of the primary pulley to the input torque.

3. A system for preventing a belt slip of a continuously variable transmission according to claim 1, further comprising torque down control means for reduction-controlling an output of the engine, said torque down control means controlling the output of the engine by setting the torque capacity of the primary pulley as an upper limit.

4. A system for preventing a belt slip of a continuously variable transmission according to one of claims 1 to 3, wherein the input torque compared with the torque capacity of the primary pulley in the line pressure correcting means is an engine demand torque.

5. A system for preventing a belt slip of a continuously variable transmission where a belt entrains around a primary pulley connected to an engine and a secondary pulley connected to an output shaft, and a primary pressure and a secondary pressure respectively using a line pressure as an original pressure act on the primary pulley and the secondary pulley, comprising:

pulley reverse rotation detecting means for detecting a reverse rotation of the pulleys, where the pulleys rotate in the direction opposite to the intended rotating direction currently set for;

primary pulley torque capacity calculating means for calculating a torque capacity of the primary pulley; and torque-down controlling means for reduction-controlling an output of the engine to be smaller than the torque capacity of the primary pulley at the time of the reverse rotation of the pulleys.

* * * * *